(12) United States Patent
Dong et al.

(10) Patent No.: US 11,533,719 B2
(45) Date of Patent: Dec. 20, 2022

(54) SYSTEMS AND METHODS FOR MANAGING UPLINK AND DOWNLINK THROUGHPUT

(71) Applicant: Verizon Patent and Licensing Inc., Arlington, VA (US)

(72) Inventors: Yuexin Dong, Bridgewater, NJ (US); Indraneel Sen, Livingston, NJ (US); Yuk Lun Li, Morganville, NJ (US); Weimin Liu, Chatham, NJ (US); Dan Sun, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 90 days.

(21) Appl. No.: 16/672,009

(22) Filed: Nov. 1, 2019

(65) Prior Publication Data

US 2021/0136755 A1  May 6, 2021

(51) Int. Cl.
*H04W 72/04* (2009.01)
*H04L 5/14* (2006.01)

(52) U.S. Cl.
CPC ....... *H04W 72/0446* (2013.01); *H04L 5/1469* (2013.01); *H04W 72/042* (2013.01); *H04W 72/048* (2013.01); *H04W 72/0413* (2013.01); *H04W 72/0486* (2013.01)

(58) Field of Classification Search
CPC ......... H04W 72/0446; H04W 72/0413; H04W 72/042; H04W 72/048; H04W 72/0486; H04L 5/1469
See application file for complete search history.

(56) References Cited

U.S. PATENT DOCUMENTS

| | | | | |
|---|---|---|---|---|
| 6,330,700 | B1 * | 12/2001 | Morris | H03M 13/03 714/752 |
| 6,577,641 | B1 * | 6/2003 | Izumi | H04B 7/2643 370/442 |
| 8,958,349 | B2 * | 2/2015 | Wang | H04W 72/04 370/312 |
| 9,185,620 | B2 * | 11/2015 | Khoryaev | H04W 36/22 |
| 9,450,717 | B2 * | 9/2016 | Fu | H04L 5/0096 |
| 9,602,991 | B1 * | 3/2017 | Zhang | H04W 4/20 |
| 9,692,584 | B2 * | 6/2017 | Siomina | H04L 5/16 |
| 10,498,500 | B2 * | 12/2019 | Rahman | H04L 5/1469 |
| 2010/0284289 | A1 * | 11/2010 | Suo | H04W 56/002 370/252 |
| 2013/0051288 | A1 * | 2/2013 | Yamada | H04L 5/001 370/280 |
| 2014/0086078 | A1 * | 3/2014 | Malladi | H04W 72/042 370/252 |
| 2014/0204854 | A1 * | 7/2014 | Freda | H04W 72/042 370/329 |

(Continued)

*Primary Examiner* — Rasheed Gidado

(57) ABSTRACT

A method may include receiving, at a wireless station, device capability information associated with a number of user equipment (UE) devices and determining, by the wireless station, uplink and downlink configurations for a number of carriers associated with the wireless station. The method may also include configuring uplink and downlink time slots for each of the carriers based on the determined uplink and downlink configurations and modifying the uplink and downlink configurations for at least some of the carriers over time based on data usage or congestion associated with the at least some of the plurality of carriers.

20 Claims, 6 Drawing Sheets

(56) References Cited

U.S. PATENT DOCUMENTS

| | | | |
|---|---|---|---|
| 2015/0103703 A1* | 4/2015 | Zeng | H04L 5/1469 370/280 |
| 2016/0057758 A1* | 2/2016 | Ouchi | H04W 72/042 370/280 |
| 2016/0302203 A1* | 10/2016 | Liu | H04L 5/0098 |
| 2017/0230148 A1* | 8/2017 | Xu | H04L 5/14 |
| 2018/0220407 A1* | 8/2018 | Xiong | H04L 5/0035 |

* cited by examiner

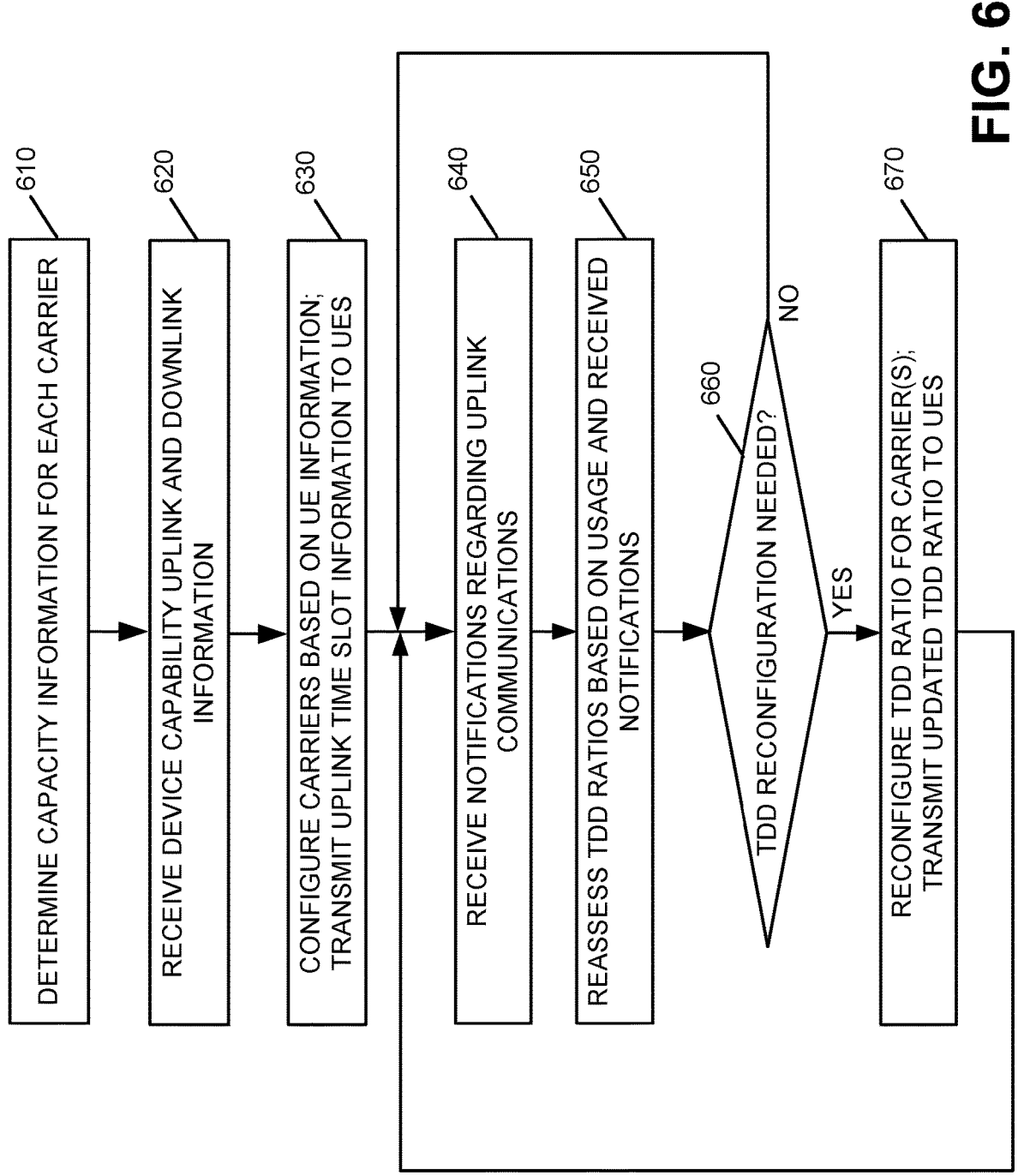

SYSTEMS AND METHODS FOR MANAGING UPLINK AND DOWNLINK THROUGHPUT

BACKGROUND INFORMATION

Fifth Generation (5G) networks, such as 5G new radio (NR) networks using millimeter wave (mmWave) technology, typically operate using a time division duplex (TDD) system that divides uplink and downlink transmissions into separate time slots. For example, the radio access network (RAN) in a 5G network utilizes duplex communication links in which uplink transmissions from user devices are separated from downlink transmissions to user devices by the allocation of different time slots in the same frequency band.

A service provider operating a 5G network may set a TDD ratio for its base stations in which the ratio of downlink time slots to uplink time slots is configured to allow for an adequate amount of uplink and downlink throughput for most scenarios. However, with user devices running applications that require an increased amount of uplink throughput or bandwidth, it is difficult for the service provider to effectively select a TDD ratio that is adequate for all scenarios. For example, in a situation in which a user device is attempting to transmit information via an uplink, the number of uplink time slots allotted to the user device may be inadequate to support the user device's uplink requirements. As a result, latency and other problems associated with the lack of adequate time slots for transmitting data often occur.

BRIEF DESCRIPTION OF THE DRAWINGS

FIG. 6 is a flow diagram illustrating exemplary processing in the environment of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein include generating time division duplex (TDD) ratios of downlink time slots to uplink time slots for a number of carriers associated with a wireless station based on user device capabilities and expected usage. The TDD ratios may then be periodically modified based on actual usage of the uplink time slots by user devices. In some implementations, a user device may communicate latency or congestion related information to the wireless station associated with the user device transmitting data to the wireless station. The wireless station may use the latency or congestion information when modifying the TDD ratios for particular carriers.

For example, when user devices in a portion of a 5G radio access network (RAN) are experiencing delays in transmitting data, the user devices may each send a notification to the wireless station (e.g., a next generation nodeB (gNB)). The gNB may then modify the TDD ratio for a carrier servicing the user devices experiencing delays to increase the number of uplink time slots available to the user devices. This dynamic modification of TDD ratios on a per carrier basis allows the service provider to efficiently partition throughput or bandwidth between uplink and downlink time slots and may reduce latency and network congestion associated with transmissions from user devices.

Figure 1:
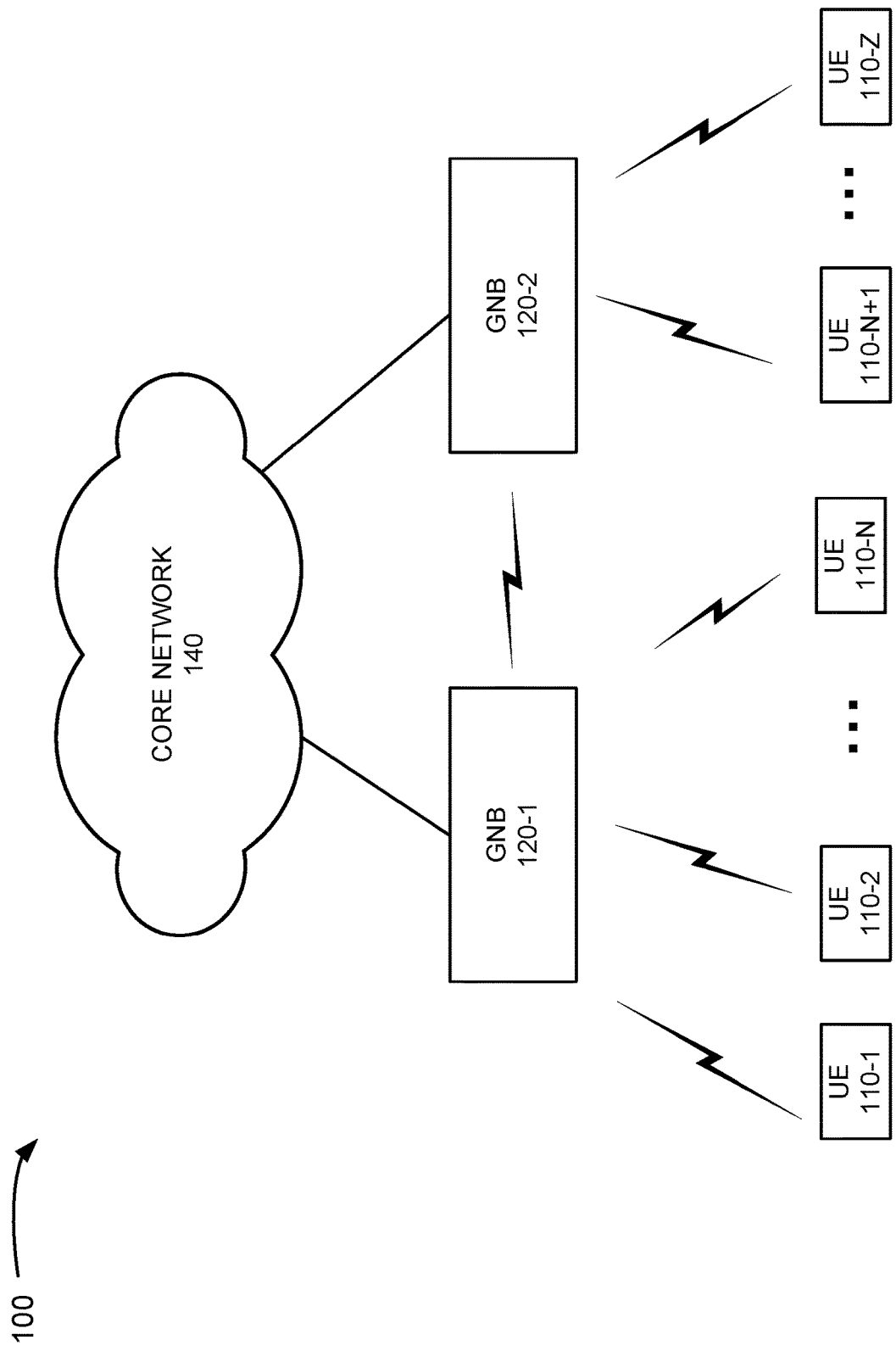
FIG. 1 illustrates an exemplary environment in which systems and methods described herein may be implemented.

FIG. 1 is a block diagram of an exemplary environment 100 in which systems and methods described herein may be implemented. Environment 100 may include user equipment (UE) devices 110-1 through 110-Z (referred to herein individually as UE device 110, UE device 110-x, UE 110 or UE 110-x, where x is an integer, and collectively as UE devices 110 or UEs 110), next generation NodeBs (gNBs) 120-1 and 120-2 (referred to herein individually as gNB, gNodeB or wireless station 120, 120-x and collectively as gNBs, gNodeBs or wireless stations 120) and core network 140.

UEs 110 may each include a mobile device, such as wireless or cellular telephone device (e.g., a conventional cell phone with data processing capabilities), a smart phone, a personal digital assistant (PDA) that can include a radiotelephone, etc. UEs 110 may also include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. UEs 110 may also be implemented as a machine-type communications (MTC) device, an Internet of Things (IoT) device, a machine-to-machine (M2M) device, etc., that includes communication functionality, such as a home appliance device, a home monitoring device, a camera, etc. UEs 110 may connect to gNBs 120 in a wireless manner. UE 110 and the person associated with UE 110 (e.g., the party holding or using UE 110) may be referred to collectively as UE 110 in the description below.

In an exemplary implementation, UEs 110 may use wireless channels to communicate with gNBs 120. The wireless channels may correspond, for example, to a physical layer in accordance with different radio access technology (RAT) types. For example, wireless channels may correspond to the physical layer associated with Fourth Generation (4G), 4.5G, 5G New Radio (5G NR) standards (e.g., 3GPP standards for 4G, 4.5G and 5G air interfaces). In an exemplary implementation, UEs 110 may be 5G-capable devices that provide voice communication, mobile broadband services (e.g., video streaming, real-time gaming, high speed Internet access etc.), best effort data traffic, and/or other types of applications via a 5G NR service using millimeter wave (mmWave) radio frequencies.

gNBs 120 (also referred to herein as wireless stations or base stations) may each include a network device that has computational and wireless communication capabilities. gNBs 120 may each include a transceiver system that connects UE device 110 to other components of a RAN and core network using wireless/wired interfaces. In one implementation, each gNB 120 may be a 5G capable device configured to receive 5G communications over a RAN using, for example, mmWave technology. In such implementations, gNBs 120 may include one or more radio frequency (RF) transceivers facing particular directions. For example, gNBs 120 may each include three RF transceivers and each RF transceiver may service a 120° sector of a 360° field of view. Each RF transceiver may also include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element.

According to one implementation, core network 140 may include a 5G new radio (NR) network. In such an implementation, core network 140 may include various network elements implemented in network devices (not shown). For example, depending on the implementation, core network 140 may include network elements implementing a user plane function (UPF), a session management function (SMF), a core access and mobility management function (AMF), a unified data management (UDM), a network slice selection function (NSSF), a policy control function (PCF), as well as other network elements associated with billing, security, authentication and authorization, network policies, subscriber profiles, network slicing, and other network elements that facilitate the forwarding of data to its destination. In some implementations, core network 140 may include a network for delivering Internet protocol (IP) multimedia services and may provide media flows between UE device 110 and external IP networks (not shown in FIG. 1).

The exemplary configuration illustrated in FIG. 1 is provided for simplicity. It should be understood that a typical environment may include more or fewer devices than illustrated in FIG. 1. For example, environment 100 may include a large number (e.g., thousands or more) of UEs 110, gNBs 120, as well as multiple core networks 140. In addition, environment 100 may include additional elements, such as switches, gateways, routers, monitoring devices, etc., that aid in routing data to/from UEs 110.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
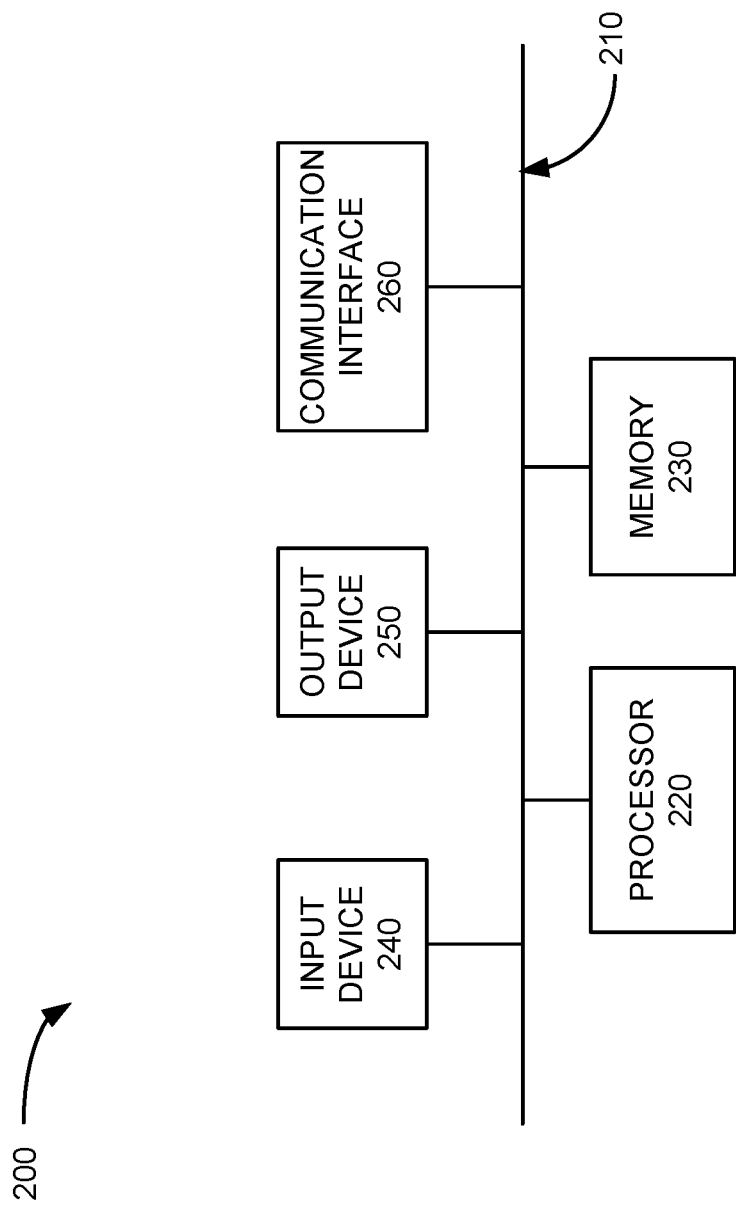
FIG. 2 illustrates an exemplary configuration of components implemented in one or more of the devices/elements of FIG. 1.

FIG. 2 illustrates an exemplary configuration of a device 200. Device 200 may correspond to or include elements implemented in UE 110, gNB 120 and/or core network 140. Referring to FIG. 2, device 200 may include bus 210, processor 220, memory 230, input device 240, output device 250 and communication interface 260. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via core network 140. Communication interface 260 may also include a modem or an Ethernet interface to a LAN or other mechanisms for communicating with elements in a network, such as core network 140 or another network.

The exemplary configuration illustrated in FIG. 2 is provided for simplicity. It should be understood that device 200 may include more or fewer devices than illustrated in FIG. 2. In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
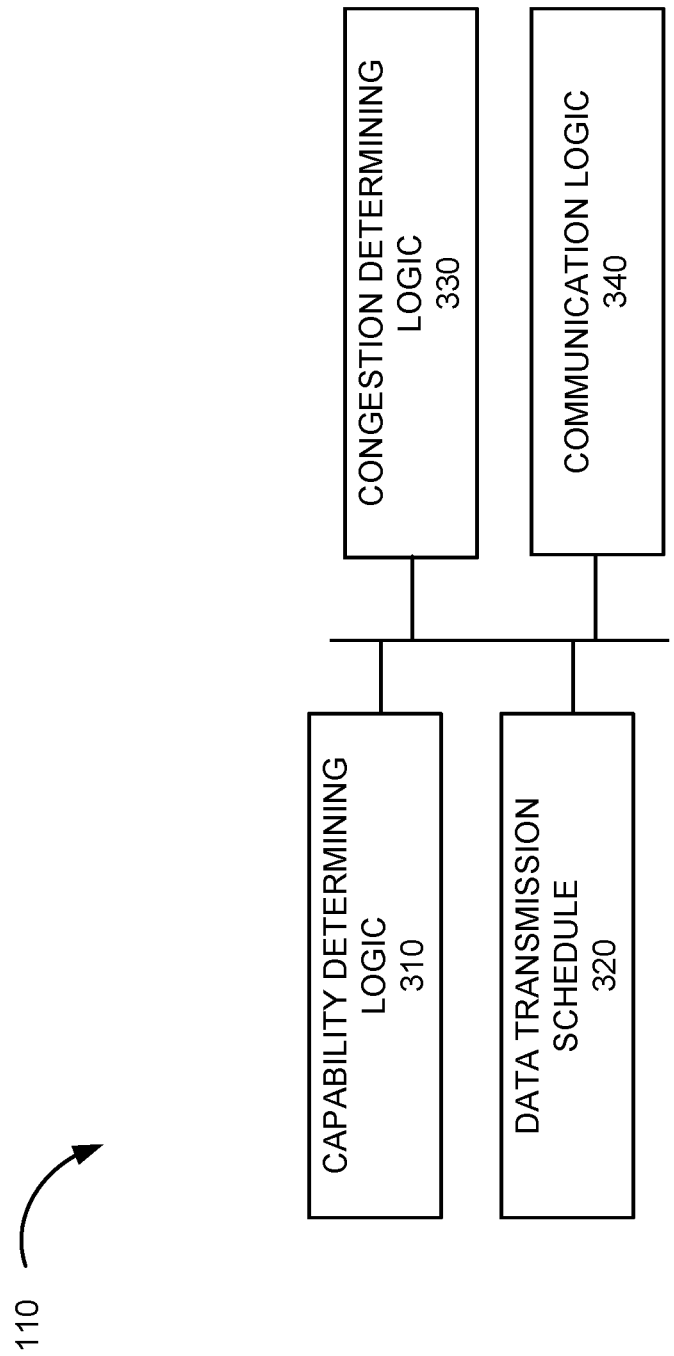
FIG. 3 illustrates an exemplary configuration of logic components included in one or more of the user equipment devices of FIG. 1.

FIG. 3 is a block diagram illustrating exemplary components implemented in UEs 110. In an exemplary implementation, all or some of the components illustrated in FIG. 3 may be implemented by processor 220 executing instructions stored in memory 230.

Referring to FIG. 3, UE 110 includes capability determining logic 310, data transmission schedule 320, congestion determining logic 330 and communication logic 340. Capability determining logic 310 may include logic to determine the data transmission and reception capabilities associated with UE 110. For example, capability determining logic 310 may determine the uplink and downlink capabilities associated with UE 110, such as the uplink and downlink capacity of one or more RF transceivers, which are included in UE 110 that transmit and receive data packets to/from gNBs 120. The capacity information may be used by gNBs 120 to generate TDD ratios for uplink/downlink throughput, as described in detail below.

Data transmission schedule 320 may include a table or database storing time slots for uplink data transmissions from UE 110. For example, gNB 120 may provide information to UE 110 indicating a schedule of time slots for transmitting data from UE 110 to gNB. The time slots may correspond to a TDD ratio generated by gNB 120 and communicated to UEs 110, as described in more detail below.

Congestion determining logic 330 may include logic associated with determining and reporting issues associated with delays or congestion associated with data transmitted from UE 110. For example, congestion determining logic 330 may determine if time delays associated with transmitting data from UE 110 are greater than a predetermined amount of time, whether output buffers associated with data to be transmitted from UE 110 are filling up beyond a threshold amount, whether the rate of the filling of the output buffers exceeds a threshold, etc. This information generated by congestion determining logic 330 may be used by gNBs 120 to determine whether to change a TDD ratio for a particular carrier, as described in detail below.

Communication logic 340 may include logic associated with forwarding data to gNB 120 and receiving data from gNB 120. For example, communication logic 340 may receive time slot information for transmitting data to gNB 120. This information may be stored in data transmission schedule 320. Communication logic 340 may also transmit information to gNB, such as uplink data associated with an application executed by gNB 120, congestion related information associated with congestion and/or delays associated with uplink data transmissions, etc.

Although FIG. 3 shows exemplary components of UE 110, in other implementations, UE 110 may include fewer components, different components, differently arranged components, or additional components than depicted in FIG. 3. In addition, functions described as being performed by one of the components in FIG. 3 may alternatively be performed by another one or more of the components of UE 110.

Figure 4:
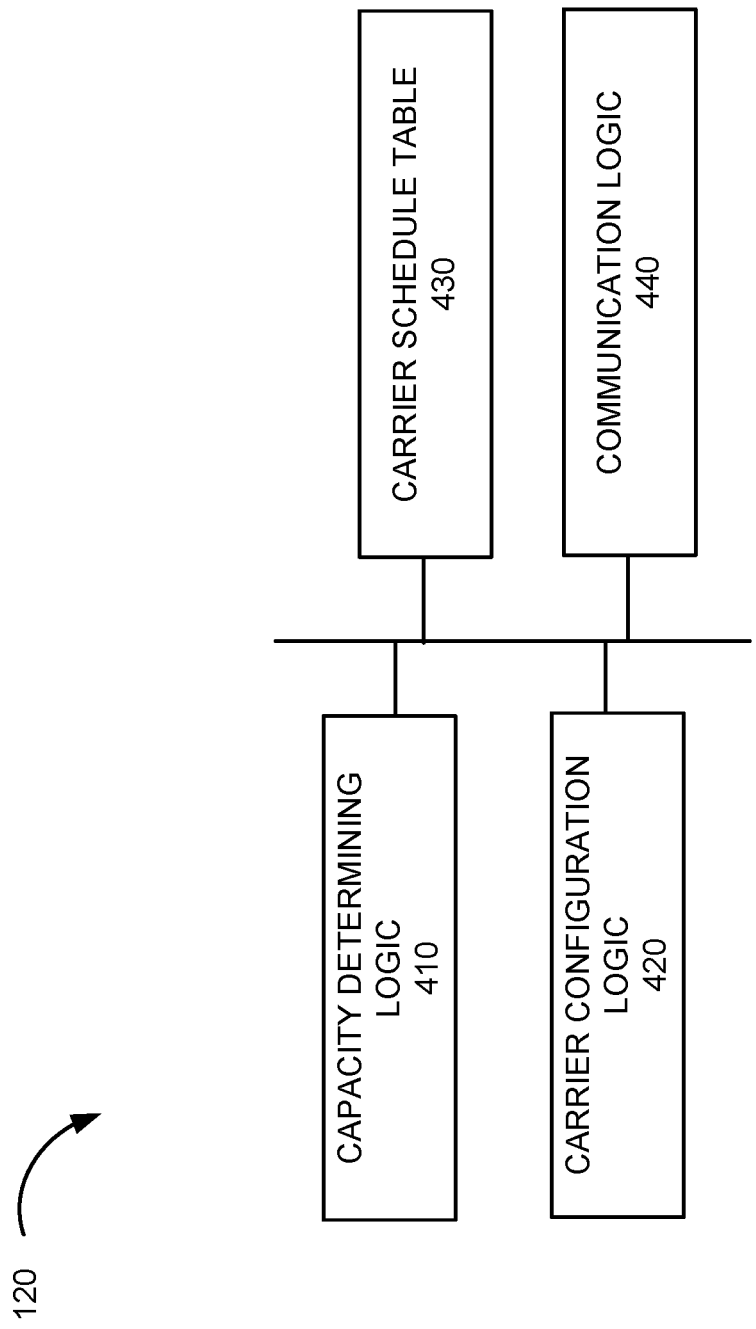
FIG. 4 illustrates an exemplary configuration of logic components included in one or more of the wireless stations of FIG. 1.

FIG. 4 is a block diagram illustrating exemplary components implemented in gNB 120. In an exemplary implementation, all or some of the components illustrated in FIG. 4 may be implemented by processor 220 executing software instructions stored in memory 230.

Referring to FIG. 4, gNB 120 includes capacity determining logic 410, carrier configuration logic 420, carrier schedule table 430 and communication logic 440. Capacity determining logic 410 may determine the uplink and downlink capacity associated with carriers associated with gNB 120. For example, each sector or cell supported by gNB 120 may provide communications via a number of separate carriers. In one implementation, the number of carriers may be eight. However, it should be understood that other numbers of carriers may be used (e.g., six, ten, twelve, etc.). In each case, capacity determining logic 410 may determine the capacity of each carrier to support both uplink and downlink traffic.

Carrier configuration logic 420 may configure a TDD ratio for each carrier. For example, carrier configuration logic 420 may set an initial TDD ratio for each carrier based on an expected or actual number of UEs 110 connected to gNB 120 in a particular cell, expected usage levels including uplink usage levels of UEs 110, capacity information obtained from capacity determining logic 410 and UE 110 capability information provided by capability determining logic 310. Carrier configuration logic 420 may also periodically or dynamically update or modify the TDD ratio for each carrier based on the particular conditions in environment 100. For example, carrier configuration logic 420 may receive information from congestion determining logic 330 included in a number of UEs 110 and modify the TDD ratio for one or more carriers based on the congestion/delays at UEs 110, as described in detail below.

Figure 5:
FIG. 5 illustrates an exemplary carrier schedule table stored in the wireless stations of FIG. 1.

Carrier schedule table 430 may include a database or table that stores uplink and downlink time slots for each carrier based on the generated TDD ratio. For example, FIG. 5 illustrates an exemplary carrier schedule table 430 in accordance with one implementation. Referring to FIG. 5, carrier schedule table 430 includes a number of columns 510-1 through 510-N storing information identifying uplink and downlink time slots for carriers C1 through CN, respectively, where N is the number of carriers associated with a sector or cell of gNB 120. As described above, in one implementation, the number of carriers per sector may be eight. In each case, carrier configuration logic 420 may configure carrier schedule table 430 based on an initial TDD ratio that is expected to provide adequate uplink and downlink time slots/bandwidth (represented by "U" and "D", respectively) for most scenarios. For example, carrier configuration logic 420 may determine that an initial TDD ratio of 90% (i.e., 90 percent of the time slots are allocated to downlink communications from gNB 120 and 10% percent of the time slots are allocated to uplink communications from UEs 110) for a particular carrier is adequate for most scenarios. Carrier configuration logic 420 may also determine that an initial TDD ratio of 70%, 60%, etc., may be appropriate for other carriers supported by gNB 120. For example, the TDD ratio for a carrier supporting UEs 110 in which uplink traffic is expected to be heavy may be set to 50% (i.e., one half the time slots are reserved for uplink traffic). In each case, carrier configuration logic 420 may set an initial TDD ratio and corresponding downlink and uplink time slots for each carrier in carrier schedule table 430.

Carrier configuration logic 420 may also periodically determine whether changes to the TDD ratio are needed based on, for example, information from UEs 110. For example, in one implementation, carrier configuration logic 420 may reassess TDD ratios every predetermined period of time (e.g., about every 30 milliseconds (ms), about every 40 ms, about every 80 ms, etc.). Carrier configuration logic 420 may also receive information from congestion determining logic 330 when congestion or delays are occurring at UEs 110. In this implementation, carrier configuration logic 420 may periodically modify the TDD ratio based on the received delay/congestion information, as well as usage information for each carrier. For example, if delays/congestion are occurring on a particular carrier in which uplink usage is high, carrier configuration logic 420 may modify the TDD ratio for that carrier from, for example, 90% to 60% or 50%. In each case, carrier configuration logic 420 may modify carrier schedule table 430 based on real time analysis of environment 100, as described in more detail below.

Communication logic 440 may include logic associated with forwarding data to UEs 110 and/or other elements/devices in environment 100. For example, communication logic 440 may forward via one or more RF transceivers an initial TDD ratio/schedule including uplink time slot information to UEs 110 based on the appropriate TDD ratio stored in carrier schedule table 430. Communication logic 440 may also forward updated TDD ratio/schedule information to UEs 110.

Although FIG. 4 shows exemplary components of gNB 120, in other implementations, gNB 120 may include fewer components, different components, differently arranged components, or additional components than depicted in FIG. 4. In addition, functions described as being performed by one of the components in FIG. 4 may alternatively be performed by another one or more of the components of gNB 120. It is also noted that although FIG. 5 illustrates an exemplary carrier schedule table 430, carrier schedule table 430 may include additional fields and/or differently arranged fields.

FIG. 6 is a flow diagram illustrating processing associated with configuring and modifying TDD ratios associated with carriers in accordance with an exemplary implementation. Processing may begin with gNB 120 determining the capacity of each particular carrier associated with a sector or cell associated with gNB 120 (block 610). For example, as described above, gNB 120 may support multiple carriers (e.g., eight or more) for each sector or cell associated with gNB 120. In this implementation, capacity determining logic 410 may determine the uplink and downlink capacity of each particular carrier.

UEs 110 may also transmit uplink and downlink capability information to gNBs 120. For example, upon connecting with a gNB 120, each UE 110 may transmit its uplink and downlink capability information to gNB 120. gNB 120 may receive the capability information from multiple UEs 110 in each sector or cell supported by gNB 120 (block 620). gNB 120 may configure TDD ratios for each of the carriers based on the received UE 110 capability information and the capacity for each carrier (block 630). For example, carrier configuration logic 420 may determine a TDD ratio of uplink time slots to downlink time slots that will provide an adequate amount of uplink and downlink throughput/bandwidth to each UE 110 connected to gNB 120.

As an example, carrier configuration logic 420 may determine that carrier 1 (C1) will have a TDD ratio of 90% (i.e., 90% of the time slots are reserved for downlink traffic from gNB 120), C2 will have a TDD ratio of 60%, C3 will have a TDD ratio of 50%, etc. In each case, carrier configuration logic 420 may allocate uplink and downlink slots in carrier schedule table 430 based on the TDD ratio, as described above with respect to FIG. 5. Communication logic 440 may also transmit uplink/downlink time slot information to UEs 110 to allow UEs and gNBs 110 to be synchronized with respect to uplink/downlink traffic on a TDD link (block 630). For example, communication logic 440 may transmit the TDD ratio and/or time slot information indicating the timing associated with uplink time slots allocated to UEs 110.

As described previously, gNB 120 may receive notifications from UEs 110 indicating that the particular UEs 110 are experiencing delays or congestion with respect to uplink communications (block 640). For example, congestion determining logic 330 may determine that output buffers at UE 110 are filled beyond a threshold level, that a rate of the output buffers at UE 110 filling exceeds a threshold rate, that delays associated with uplink transmissions exceed a threshold amount of time, or other congestion/delay problems associated with transmitting data to its intended destination. UEs 110 may forward the delay/congestion information to gNB 120 any time when the delays/congestion occur.

As also described above, UEs 110 may periodically reassess the TDD ratios for each carrier (block 650). For example, UEs 110 may move into and out of wireless range of gNBs 120, resulting in handoffs between gNBs 120 supporting UEs 110, including supporting existing communication sessions. For example, UE 110-2 may move from an area supported by gNB 120-1 to an area supported by gNB 120-2. As a result, the number of UEs 110 supported by a particular gNB 120 at any time may change rapidly. In an exemplary implementation, gNBs 120 may reassess the TDD ratios frequently, such as about every 30 milliseconds (ms) to accommodate the changing conditions in environment 100. It should be understood that in alternative implementations, gNB 120 may reassess and change TDD ratios, if necessary, more or less frequently based on the particular environment 100, such as about every 20 ms or less, about every 40 ms or more, etc. In each case, gNB 120 may periodically reassess the TDD ratios for each of the carriers supported by gNB 120.

For example, carrier configuration logic 420 may reassess the TDD ratio for a particular carrier based on the number of UEs 110 supported by the particular carrier, congestion at particular UEs 110 associated with the particular carrier, actual uplink usage associated with the particular carrier, etc. For example, carrier configuration logic 420 may determine that uplink time slots for a particular carrier are not being used and may adjust the TDD ratio to reduce the amount of uplink time slots for that carrier (e.g., increase the TDD ratio from, for example, 60% to 70%). Alternatively, if UEs 110 associated with a particular carrier are using all of the allocated uplink time slots (e.g., executing applications requiring significant uplink time slots), carrier configuration logic 420 may decrease the TDD ratio (e.g., increase the number of uplink time slots).

Carrier configuration logic 420 may also use the notification information regarding delays/congestion at UEs 110 to reassess the TDD ratios. For example, if a number of UEs 110 associated with a particular carrier are transmitting delay/congestion information to gNB 120, carrier configuration logic 420 may then determine that a TDD ratio modification to increase the number of uplink time slots is needed for that particular carrier.

In each case, carrier configuration logic 420 may determine whether a TDD ratio modification/reconfiguration is needed (block 660). If carrier configuration logic 420 determines that a TDD ratio for one or more carriers needs to be changed (block 660—yes), carrier configuration logic 420 may modify the TDD ratio for the one or more carriers (block 670). For example, if carrier configuration logic 420 determines that additional uplink time slots are need for carrier 3 associated with a particular cell/sector, carrier configuration logic 420 may change the TDD ratio from, for example, 90% to, for example, 60%, resulting in increased uplink time slots from UEs 110 to gNB 120 for that carrier. Carrier configuration logic 420 may store the changes in carrier schedule table 430 and transmit the updated information to UEs 110 supported by carrier 3 (block 670). For example, carrier configuration logic 420 may configure the appropriate number of uplink and downlink time slots in column 510-3 of carrier schedule table 430 corresponding to the modified TDD ratio. Carrier configuration logic 420 may also transmit the updated TDD ratio/uplink time slot information to the appropriate UEs 110 via communication logic 440.

If, however, TDD ratio reconfiguration is not needed (block 660—no), processing may continue. That is, gNB 120 may continue to receive notifications regarding congestion/delay at UEs 110, perform real time monitoring of data usage in environment 100 and periodically determine if the TDD ratios need to be modified.

In this manner, gNB 120 may monitor conditions in environment 100 and modify TDD ratios as needed. Performing modifications of TDD ratios for individual carriers increases the flexibility associated with wireless service providers supporting wireless services and helps to ensure that adequate uplink and downlink throughput/bandwidth is provided.

As described above, gNBs 120 determine whether to reconfigure TDD ratios based on a number of factors, such as the number of UE devices supported by each carrier, real-time data usage of uplink and downlink time slots, congestion/delays at UEs 110, etc. gNBs 120 may also manage uplink/downlink time slots for particular UEs 110 during handoffs. For example, when a UE 110 moves from an area services by gNB 120-1 to an area serviced by gNB 120-2, gNBs 120-1 and 120-2 may exchange information regarding the capabilities of UE 110. Alternatively, UE 110 may signal gNB 120-2 with information regarding its uplink and downlink capabilities. In each case, gNBs 120 may manage TDD ratio configurations at each respective gNB 120 based on how many UEs 110 are supported by gNB 120, including communication sessions that occur based on a handoff.

Further, as described above, UEs 110 may signal gNBs 120 when congestion/delays occur with respect to uplink transmissions from UE 110. In some implementations, a UE 110 may signal gNB 120 information regarding its need for additional uplink time slots via an application programming interface (API) at UE 110. For example, UE 110 may use an API associated with applications executed by UE 110 to signal gNB 120 with information indicating UEs 110's need for more uplink capacity. For example, if UE 110 is executing a gaming application requiring relatively high uplink throughput/bandwidth, an API at UE 110 may signal gNB 120 with the uplink requirements.

Implementations described herein provide for dynamically modifying the availability of uplink and downlink time slots for individual carriers associated with a wireless station. This allows the service provider to have flexibility with respect to managing both uplink and downlink throughput or bandwidth. In addition, implementations described herein dynamically modify TDD ratios based on usage, congestion and/or other factors. This further allows the service provider to reduce latency and increase efficiency with respect to network resources.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to configuring and periodically modifying TDD ratios based on data usage and congestion. In other implementations, carrier configuration logic 420 may reassess TDD ratio configurations on a real-time basis and may continuously monitor TDD ratios based on usage, congestion or other factors. In such implementation, gNB 120 may modify TDD ratios, as necessary, in a real time on-demand manner, as opposed to performing the reassessment at predetermined periods of time.

Further, while series of acts have been described with respect to FIG. 6, the order of the acts may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, at a wireless station, device capability information associated with a plurality of user equipment (UE) devices;
   determining, by the wireless station, uplink and downlink configurations for a plurality of carriers associated with the wireless station;
   configuring uplink and downlink time slots for each of the plurality of carriers based on the determined uplink and downlink configurations;
   receiving, at the wireless station, a notification from at least one of the plurality of UE devices indicating that the at least one of the plurality of UE devices is experiencing congestion at the UE device in transmitting data to the wireless station; and
   modifying the uplink and downlink configurations for at least some of the plurality of carriers over time based on the received notification from the at least one of the plurality of UE devices indicating that the at least one of the plurality of UE devices is experiencing congestion at the UE device,
   wherein the modifying comprises increasing a number of uplink time slots for at least one of the plurality of carriers based on the received notification indicating that the at least one of the plurality of UE devices is experiencing congestion.

2. The method of claim 1, wherein the wireless station is configured to communicate with the plurality of UE devices in accordance with a Fifth Generation (5G) radio access technology or protocol using time division duplex (TDD) links.

3. The method of claim 2, wherein the configuring comprises:
   determining a TDD ratio of downlink time slots to uplink time slots for each of the plurality of carriers; and storing, in a memory at the wireless station, a schedule of the uplink and downlink time slots for each of the plurality of carriers in accordance with the determined TDD ratios.

4. The method of claim 2, wherein a TDD ratio for at least some of the plurality of carriers is different than the TDD ratio for other ones of the plurality of carriers.

5. The method of claim 1, further comprising:
transmitting, by the wireless station, information associated with the uplink and downlink configuration to the plurality of UE devices.

6. The method of claim 1, wherein the modifying further comprises periodically modifying a number of the uplink time slots and a number of the downlink time slots based on data usage and congestion associated with the uplink time slots.

7. The method of claim 1, wherein the modifying further comprises modifying the number of uplink time slots and downlink time slots based on at least one of data usage, congestion associated with the uplink time slots or a number of UE devices supported.

8. The method of claim 1, wherein the notification indicates at least one of:
a time delay associated with transmitting data from the at least one of the plurality of UE devices is greater than a predetermined amount of time,
an output buffer associated with data to be transmitted from the at least one of the plurality of UE devices is filling up beyond a threshold amount, or
a rate of the filling of the output buffer exceeds a threshold.

9. A device, comprising:
a communication interface; and
at least one processing device configured to:
determine uplink and downlink configurations for a plurality of carriers associated with the device,
configure uplink and downlink time slots for each of the plurality of carriers based on the determined uplink and downlink configurations,
receive a notification from at least some of a plurality of user equipment (UE) devices indicating that the at least some of the plurality of UE devices are experiencing congestion at the UE device in transmitting data to the device, and
modify the uplink and downlink configurations for at least some of the plurality of carriers over time based on the received notification from the at least some of the plurality of UE devices indicating that the at least some of the plurality of UE devices are experiencing congestion at the UE device in transmitting data to the device,
wherein when modifying, the at least one processing device is configured to:
increase a number of uplink time slots for at least one of the plurality of carriers based on the received notification indicating that the at least some of the plurality of UE devices are experiencing congestion.

10. The device of claim 9, wherein the device is a wireless station configured to communicate with a plurality of user equipment (UE) devices in accordance with a Fifth Generation (5G) radio access technology or protocol, and
wherein the at least one processing device is further configured to:
communicate with the plurality of UE devices via the communication interface using time division duplex (TDD) links.

11. The device of claim 10, wherein the at least one processing device is further configured to:
determine a TDD ratio of downlink time slots to uplink time slots for each of the plurality of carriers, and
store, in a memory, a schedule of the uplink and downlink time slots for each of the plurality of carriers in accordance with the determined TDD ratios.

12. The device of claim 11, wherein a TDD ratio for at least some of the plurality of carriers is different than the TDD ratio for other ones of the plurality of carriers.

13. The device of claim 9, wherein the at least one processing device is further configured to:
transmit information associated with the uplink and downlink configuration to a plurality of UE devices supported by the device.

14. The device of claim 9, wherein the device comprises a next generation nodeB (gNB).

15. The device of claim 9, wherein when modifying, the at least one processing device is further configured to:
modify a schedule of uplink and downlink time slots based on at least one of data usage, congestion associated with the uplink time slots or a number of user equipment (UE) devices supported by each carrier.

16. The device of claim 9, wherein when modifying the uplink and downlink configurations, the at least one processing device is further configured to:
periodically modify a number of the uplink time slots and a number of the downlink time slots based on data usage and congestion associated with the uplink time slots.

17. The device of claim 9, wherein the notification indicates at least one of:
a time delay associated with transmitting data from the at least some of the plurality of UE devices is greater than a predetermined amount of time,
an output buffer associated with data to be transmitted from the at least some of the plurality of UE devices is filling up beyond a threshold amount, or
a rate of the filling of the output buffers exceed a threshold.

18. A non-transitory computer-readable medium having stored thereon sequences of instructions which, when executed by at least one processor included in a wireless station, cause the at least one processor to:
determine uplink and downlink configurations for a plurality of carriers associated with the wireless station;
configure uplink and downlink time slots for each of the plurality of carriers based on the determined uplink and downlink configurations,
receive a notification from at least some of a plurality of user equipment (UE) devices indicating that the at least some of the plurality of UE devices are experiencing congestion at the UE device in transmitting data to the wireless station, and
modify the uplink and downlink configurations for at least some of the plurality of carriers over time based on the received notification from the at least some of the plurality of UE devices indicating that the at least some of the plurality of UE devices are experiencing congestion at the respective UE device in transmitting data to the wireless station,
wherein when modifying, the instructions cause the at least one processor to:
increase a number of uplink time slots for at least one of the plurality of carriers based on the received notification indicating that the at least some of the plurality of UE devices are experiencing congestion.

19. The non-transitory computer-readable medium of claim 18, wherein when modifying, the instructions further cause the at least one processor to:
  modify a schedule of the uplink and downlink time slots based on at least one of data usage, congestion associated with the uplink time slots or a number of UE devices supported.

20. The non-transitory computer-readable medium of claim 18, wherein the notification indicates at least one of:
  a time delay associated with transmitting data from the at least some of the plurality of UE devices is greater than a predetermined amount of time,
  an output buffer associated with data to be transmitted from the at least some of the plurality of UE devices is filling up beyond a threshold amount, or
  a rate of the filling of the output buffers exceed a threshold.

* * * * *